United States Patent [19]
Ikeda

[11] Patent Number: 5,255,871
[45] Date of Patent: Oct. 26, 1993

[54] HELICOPTER HAVING ROTORS EQUIPPED WITH FLAPS

[76] Inventor: Minoru Ikeda, 526-3 Ohishi-machi, Kurume-shi, Fukuoka-ken, Japan

[21] Appl. No.: 44,027

[22] Filed: Apr. 8, 1993

Related U.S. Application Data

[63] Continuation-in-part of Ser. No. 800,027, Nov. 29, 1991, abandoned.

[30] Foreign Application Priority Data

Nov. 29, 1990 [JP] Japan .................. 2-335743

[51] Int. Cl.⁵ .......................................... B64C 27/57
[52] U.S. Cl. .............................. 244/17.13; 244/17.25; 416/24
[58] Field of Search .............. 244/17.11, 17.13, 17.25; 416/102, 23, 24, 148, 40

[56] References Cited

U.S. PATENT DOCUMENTS

| | | |
|---|---|---|
| 1,800,470 | 4/1931 | Oehmichen . |
| 2,041,789 | 5/1936 | Stalker . |
| 2,481,750 | 9/1949 | Hiller, Jr. et al. . |
| 2,514,459 | 7/1950 | Stalker . |
| 2,716,460 | 8/1955 | Young . |
| 2,980,187 | 4/1961 | Smyth-Davila . |
| 2,998,850 | 9/1961 | Armstrong . |

FOREIGN PATENT DOCUMENTS 692078  8/1964 Canada .

OTHER PUBLICATIONS

John W. R. Taylor et al, "Jane's All The World's Aircraft", 75th Anniversary Issue, 1984–85, pp. 322, 418.

*Primary Examiner*—Galen L. Barefoot
*Attorney, Agent, or Firm*—Oblon, Spivak, McClelland, Maier & Neustadt

[57] ABSTRACT

A helicopter comprises a pair of rotors each having a flap hinged to one of its edges, a seesaw rod swingably supported above the rotors, a pair of auxiliary wings fixed to opposite ends of the seesaw rod, and a pair of connecting rods each connecting one of the flaps with seesaw rod above it. When the lift produced by one of the rotors becomes larger than that produced by the other, the auxiliary wing located above the rotor producing the larger lift rises and turns up the flap of the rotor to reduce its flap effect and decrease the rotor lift, while the auxiliary wing located above the rotor producing the smaller lift lowers and turns down the flap of the rotor to increase its flap effect and raise its lift. As a result, the lifts of the two rotors are regulated.

6 Claims, 4 Drawing Sheets

HELICOPTER HAVING ROTORS EQUIPPED WITH FLAPS

CROSS-REFERENCE TO RELATED APPLICATION

This is a continuation-in-part application of patent application Ser. No. 07/800,027, filed Nov. 29, 1991, which is now abandoned.

BACKGROUND OF THE INVENTION

1. Field of the Invention

This invention relates to a helicopter whose rotors are equipped with flaps which regulate the rotor lifts during horizontal flight so as to suppress fuselage vibration and enable stable flight.

2. Description of the Prior Art

The vertical flight of a helicopter is stable since equal amounts of lift are produced by the rotors and flapping, dragging and the like therefore do not occur.

In horizontal flight, however, the leading rotor has a larger air speed than the trailing rotor and thus generates greater lift. The lift imbalance resulting from the different positions of the rotors relative to the fuselage gives rise to flapping and dragging which cause vibration of the fuselage.

This vibration, which is a problem peculiar to helicopters, has conventionally been relieved by the installation of a stabilizer. In the Bell UH-1H, for example, this stabilizer is called a "stabilizing bar" (see Jane's All the World's Aircraft 1984-85, p. 322, right column, line 12 from the bottom), while in the Hiller UH-12ET it is referred to as a "servo rotor" (op.cit. p. 418, left column, line 17 from the bottom). Such a stabilizing bar or servo rotor is a mechanism for adjusting the pitch angle of the rotor in response to changes in the helicopter attitude (namely, a feathering mechanism) and does not eliminate extraordinary rotor flapping and/or dragging. Therefore, such stabilizers have no essential effect toward suppressing fuselage vibration.

SUMMARY OF THE INVENTION

The present invention was accomplished in view of the foregoing problems of the prior art and has as its main object to provide a helicopter which suppresses fuselage vibration during horizontal flight, thus enabling stable flight at all attitudes.

For achieving the aforesaid object the present invention provides a helicopter comprising a pair of rotors each having a flap hinged to one edge thereof, a swingable seesaw rod having auxiliary wings at its opposite ends provided above the rotors, and connecting rods connecting the flaps with the seesaw rod positioned above.

Owing to this arrangement, each rotor and the auxiliary wing above it are always subject to the same aerodynamic conditions. Therefore, when one of the rotating rotors produces a larger lift than the other, the auxiliary wing above this rotor produces a larger lift than the other auxiliary wing. Since the auxiliary wing producing the larger lift rises to a higher position than the other auxiliary wing, the seesaw rod experiences an inclining motion which acts through the linkage constituted by the seesaw rod and the connecting rod to cause the flap of the rotor located below the auxiliary wing producing the large lift to turn up and reduce the flap effect of the rotor. At the same time, this rising of the auxiliary wing on one side above its normal horizontal position is accompanied by a falling of the other auxiliary wing below its normal horizontal position and this in turn causes the flap of the rotor linked with this auxiliary wing to turn down and increase the flap effect of the rotor.

Thus when the lift of one rotor becomes large, the flap of this rotor turns up to lower the flap effect and reduce the lift, while the flap of the other rotor turns down to raise the flap effect and increase the lift. The result is automatic regulating of the lifts of the two rotors.

Since the invention balances the lifts of the rotors and eliminates extraordinary flapping and dragging due to air surge, little vibration is produced in the fuselage and, therefore, flight is stabilized and the service life of the rotors, fuselage and other helicopter components is prolonged.

The above and other features of the present invention will become apparent from the following description made with reference to the drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
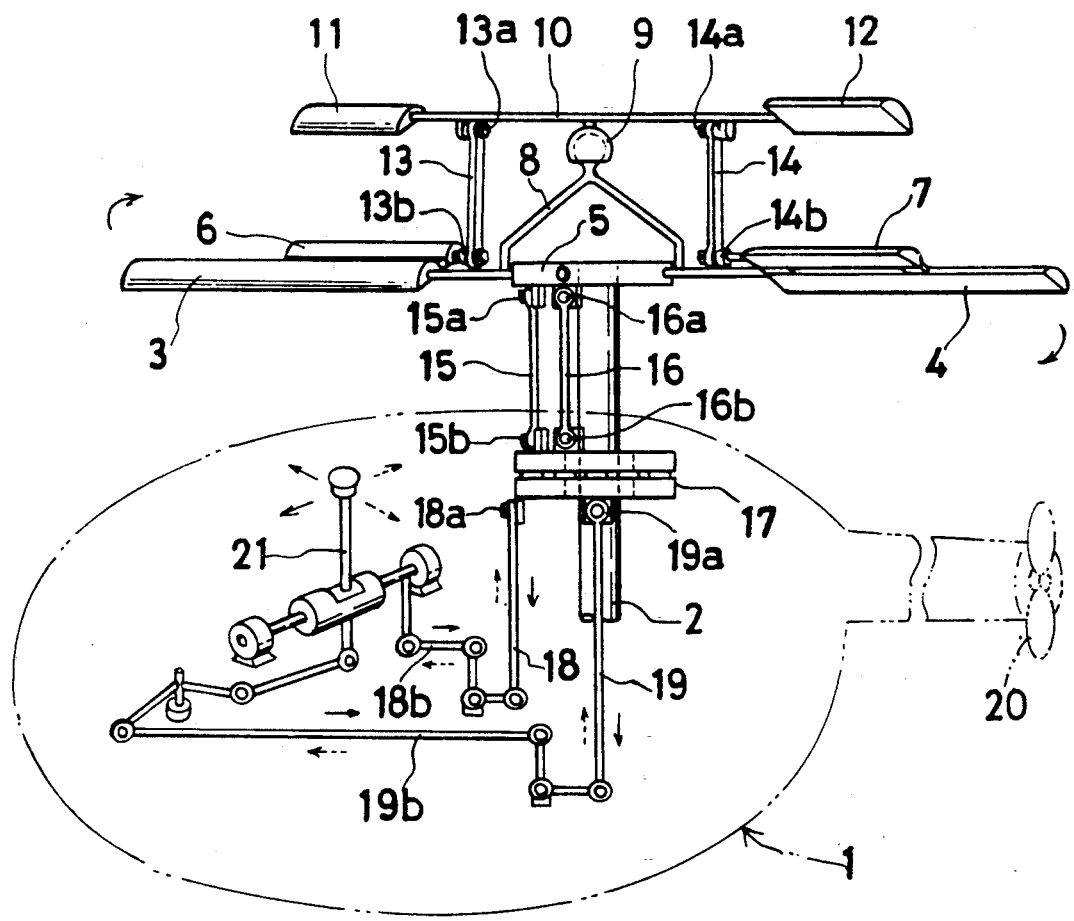
FIG. 1 is a schematic view of an embodiment of the helicopter according to the invention.
Figure 2:
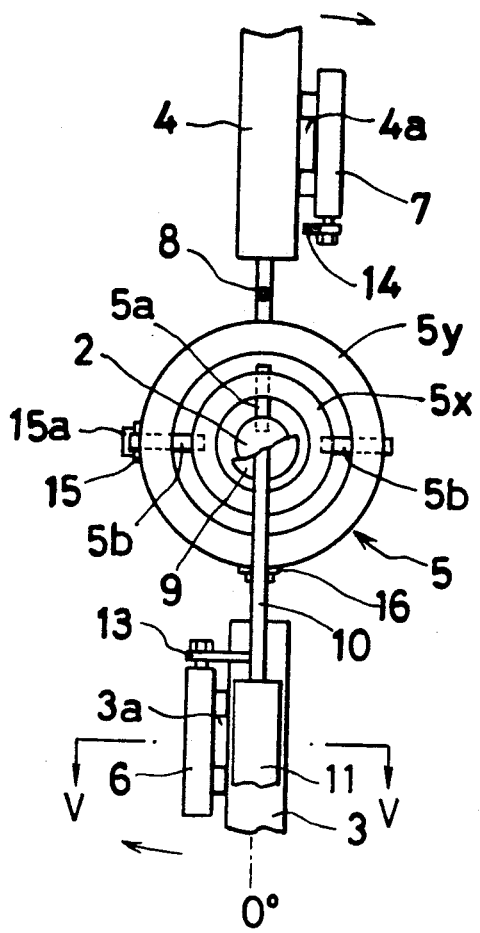
FIG. 2 is a partially cut-away plan view of the helicopter of FIG. 1.
Figure 3:
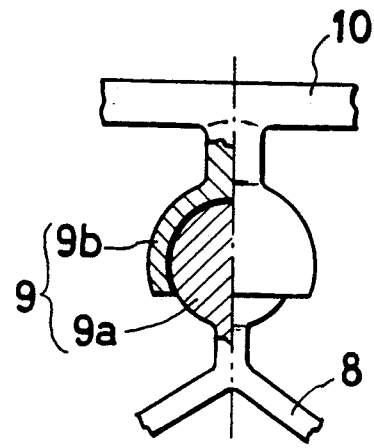
FIG. 3 is an enlarged view, partially in section, of a seesaw head of the helicopter according to the invention.
Figure 4:
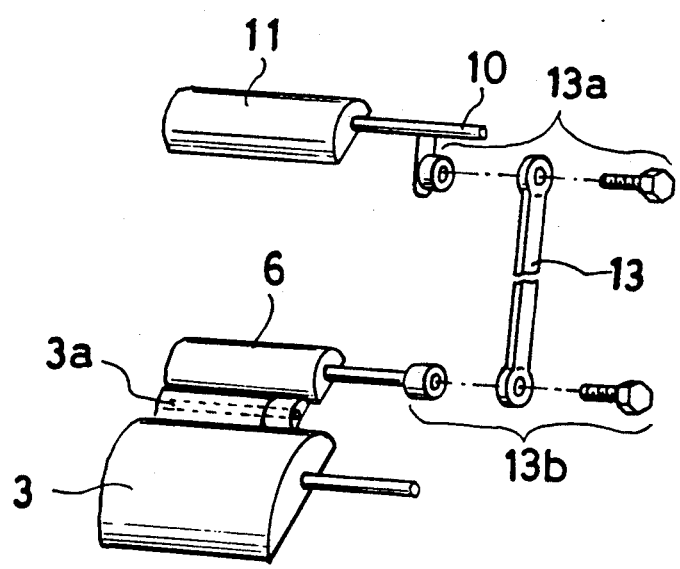
FIG. 4 is a perspective view showing the linkage between an auxiliary wing and a flap in the helicopter according to the invention.
Figure 5:
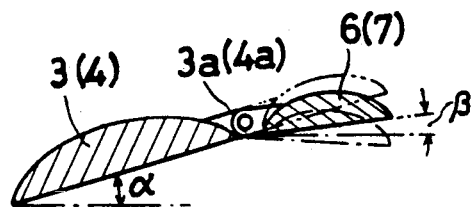
FIG. 5 is a sectional view taken along line V—V of FIG. 2.

A first embodiment of the helicopter according to the invention is shown in FIGS. 1 and 2. The helicopter comprises a fuselage 1 and a rotor head 5 supported on top of the fuselage 1 by a rotor shaft 2. A pair of rotors 3, 4 are fixed at diametrically opposite positions to an outer gimbal ring 5y of the rotor head 5 at a prescribed pitch $\alpha$ (FIG. 5). As shown in FIG. 2, the leading edges of the rotors 3, 4 have flaps 6, 7 swingably attached thereto via hinges 3a, 4a. One of a pair of auxiliary wings 11, 12 fixed to opposite ends of the seesaw rod 10 at approximately the same pitch angle as the rotors is positioned above each of the rotors 3, 4. The auxiliary wing 12 is omitted from FIG. 2 for the sake of clearly showing the construction of the rotor head 5. As shown in FIG. 3, the shell 9b of a seesaw head (ball joint) 9 is attached to the center of the seesaw rod 10. The shell 9b of the seesaw head 9 accommodates a ball 9a which is connected with the apex of a wishbone-shaped supporting frame 8. The legs of the supporting frame 8 are fixed to the roots of the rotors 3, 4. Connecting rods 13, 14 are connected at their one ends to the seesaw rod 10 at positions equidistant from the seesaw head 9, while their other ends are rotatably connected to rods fixed to the flaps 6, 7. An example of how the connecting rod 13 can be linked with the seesaw rod 10 and flap 6 is shown in FIG. 4. In the illustrated arrangement, the seesaw rod 10 and flap 6 are provided with connectors 13a, 13b each consisting of a nut and bolt and the bolt is screwed into the nut to fix the connecting rod 13 in such manner as to be rotatable and capable of sliding along the bolt to a limited degree. The illustrated arrangement is, however, only one example and various other methods of establishing a rotatable linkage such as a universal joint are also usable. The connecting rod 14 is similarly rotatably connected at its opposite ends to the seesaw rod 10 and the flap 7 with connectors 14a, 14b. The angle of attack $\beta$ (FIG. 5) of the flaps 6, 7 is determined in advance by adjusting the lengths of the connecting rods 13, 14. And by the second adjusting the lengths of the connecting rods 13 and 14, the desirable angle of grade separation between the seesaw rod 10 and the axis of the rotors 3 and 4 is set between 0° and 180° FIG. 2 illustrates an embodiment wherein the angle of grade separation between the seesaw rod 10 and the axis of the rotors 3 and 4 is substantially 0°, whereas FIG. 8 an embodiment wherein the angle is substantially 90°.

Figure 7:
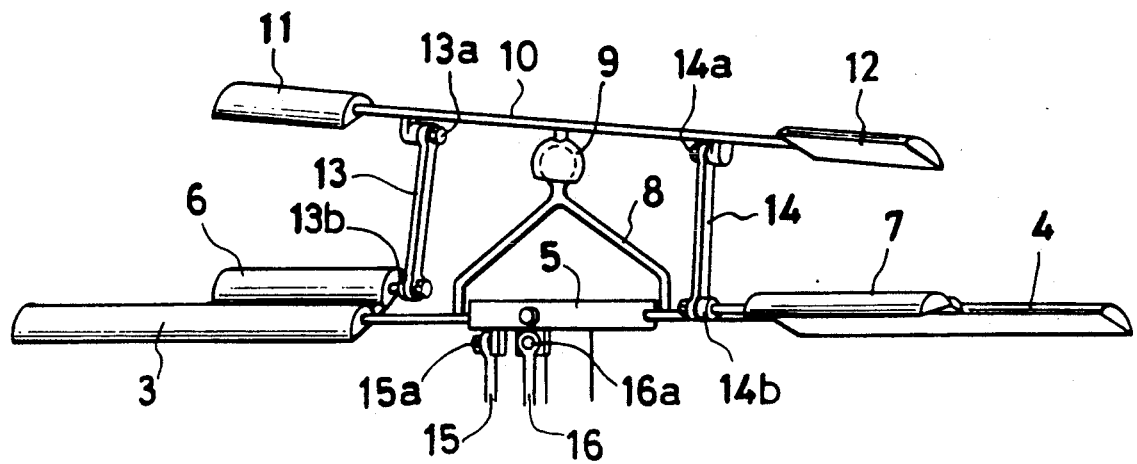
FIG. 7 is a perspective view for explaining the state of the flaps when one auxiliary wing is in a raised position and the other one is in a lowered position.

The foregoing arrangement enables the seesaw rod 10 having the auxiliary wings 11, 12 fixed to its opposite ends to be supported so as to be able to swing or rock about the seesaw head 9. When the auxiliary wings 11, 12 produce identical lifts, therefore, the seesaw rod 10 remains horizontal and, at this time, the flaps 6, 7 both assume the aforementioned predetermined angle of attack $\beta$. When a difference arises between the lifts produced by the auxiliary wings 11, 12, therefore the seesaw rod 10 is caused to incline as shown in FIG. 7. At this time, the flap 6 connected with the lower end of the connecting rod 13 on the side of the seesaw rod 10 which has risen as a result of the inclination is pulled so as to rotate upward about the hinge 3a (double dot chain line in FIG. 5). On the other hand, the flap 7 connected with the lower end of the connecting rod 14 which has lowered as a result of the inclination is pushed so as to rotate downward about the hinge 4a (single dot chain line in FIG. 5).

As shown in FIG. 2, the rotor head 5 supporting the pair of rotors 3, 4 consists of an inner gimbal ring 5x and an outer gimbal ring 5y. A pair of shafts 5b are supported at diametrically opposite positions on the outer gimbal ring 5y with their inner ends projecting into the ring interior. The inner gimbal ring 5x is supported on the inner ends of the shafts 5b so as to be rotatable thereabout and, to a limited degree, slidable therealong. A pair of shafts 5a are supported at diametrically opposite positions on the inner gimbal ring 5x with their inwardly projecting ends attached to the upper end of the rotor shaft 2 disposed at the center of the inner gimbal ring 5x. The inner gimbal ring 5x is rotatable about and, to a limited degree, slidable along the shafts 5a. The lower end of the rotor shaft 2 is connected with an engine (not shown) installed in the fuselage 1. The power output of the engine is controlled by throttling and air-fuel mixture adjustment and transmitted to the rotor head 5 to rotate it at a prescribed speed.

Figure 6:
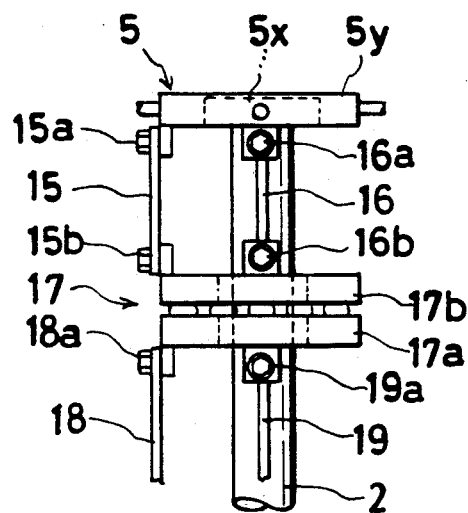
FIG. 6 is a side view showing the linkage between a rotor head and a swash plate in the helicopter according to the invention.

As shown in FIG. 6, vertically disposed connecting rods 15, 16 are connected at their upper ends to the outer gimbal ring 5y of the rotor head 5 at positions offset by 90° and at their lower ends at positions offset by 90° to a revolving disk 17b of an annular swash plate 17 located in the fuselage 1. The revolving disk 17b is in rotatable, face-to-face contact with a stationary disk 17a via a plurality of balls. Vertically disposed connecting rods 18, 19 are connected at their upper ends to the stationary disk 17a at positions offset by 90° (FIG. 6). The connecting rods 15, 16, 18 and 19 are connected with the outer gimbal ring 5y and the swash plate 17 by connectors 15a, 15b, 16a, 16b, 18a and 19a in a manner similar to that shown in FIG. 4 so as to be slidable to a limited degree. The lower ends of the connecting rods 18, 19 are connected via mutually independent linkages 18b, 19b with a control stick 21 (FIG. 1). When the control stick 21 is tilted forward or backward, the connecting rod 18 is moved vertically via the linkage 18b to tilt the swash plate 17 forward or backward, and when it is tilted laterally, the connecting rod 19 is moved vertically via the linkage 19b to tilt the swash plate 17 right or left. The rotor shaft 2 passes through the center opening of the annular swash plate 17 and these two members do not come in direct contact with each other.

In addition to what has been described in the foregoing, the fuselage 1 is equipped with a tail rotor 20 and, though not shown, also with the direction control system, aircraft instruments, skids, electrical switches and other equipment normally required by an aircraft.

When the engine of the helicopter of the foregoing arrangement is started with the control stick 21 in the neutral position, the resulting rotation of the rotor shaft 2 causes the rotor head 5 at the upper end thereof to rotate. As a result, the rotors 3, 4 fixed to the outer gimbal ring 5y of the rotor head 5 and the flaps 6, 7 attached to the rotors 3, 4 are rotated. In addition, the supporting frame 8 is also rotated owing to its connection to the roots of the rotors and this rotation is transmitted to the seesaw rod 10 through the seesaw head 9, which supports the seesaw rod 10 in a swingable manner. Since the seesaw rod 10 is connected with the flaps 6, 7 via the connecting rods 13, 14, it rotates at the same speed as the flaps 6, 7. The rotors 3, 4 and the auxiliary wings 11, 12 thus rotate at almost the same speed. Even if a slight difference in rotational speed should arise between the rotors 3, 4 and the seesaw rod 10, this will be compensated for by slippage at the connectors 13a, 13b, 14a and 14b. Since only the revolving disk 17b of the swash Plate 17 is connected with the outer gimbal ring 5y of the rotor head 5 by the connecting rods 15, 16, it rotates at the same speed as the rotor head (FIG. 1). When the rotors reach a prescribed rotational speed, the helicopter begins rising vertically. Since the lift of the rotors is the same at all points during this vertical flight, the seesaw rod 10 remains horizontal and stable flight is performed with the flaps 6, 7 of the rotors at the angle providing maximum lift.

When the control stick 21 is tilted forward from the neutral position, the connecting rod 18 is pulled down by the linkage 18b, causing the stationary disk 17a of the swash plate 17 to tilt forward and the revolving disk 17b situated above it to tilt in the same direction and by the same angle as the stationary disk 17a while continuing to rotate. Since the outer gimbal ring 5y of the rotor head 5 located above the revolving disk 17b is connected with the revolving disk 17b by the connecting rod 15, it rotates as tilted by the same angle as the stationary disk 17a. As a result, the rotors 3, 4 tilt downward with respect to the fuselage 1 so that the rotor disk 5 tilts forward. The helicopter thus shifts from vertical flight to forward flight.

When the control stick 21 is tilted backward, the result is the opposite from that just described. The connecting rod 18 pushes the stationary disk 17a upward, the swash plate 17 tilts backward, the outer gimbal ring 5y tilts in the same direction as the swash plate, and the rotors 3, 4 tilt backward with respect to the fuselage 1 so that the rotor disk tilts backward. The helicopter therefore performs backward flight.

When the control stick 21 is tilted left, the connecting rod 19 is pulled down by the linkage 19b, causing the swash plate 17 to tilt left. Since this causes the connecting rod 16 connected with the swash plate 17 to tilt the outer gimbal ring 5y in the same direction as the swash plate, the rotors 3, 4 tilt left, causing the rotor disk to tilt left. The helicopter thus flies to the left. When the control stick 21 is tilted right, the rotors are tilted in the opposite direction from the above-noted direction so that the helicopter flies to the right.

As will be understood from the foregoing, the helicopter can be made to fly in any desired direction by manipulating the control stick 21 so as to tilt the swash plate 17 and, in turn, the rotors 3, 4 in the desired direction of flight.

When an air surge is produced due to the change from vertical flight to horizontal flight, a blast of wind is encountered, or an operational mistake in use of the control stick 21 occurs, sudden flight-destabilizing rotor lift imbalance is caused and consequently the helicopter undergoes unstable flight.

However, the one of the two auxiliary wings 11, 12 fixed on the swingable seesaw rod 10 which is producing the larger lift rises owing to the difference in lift between itself and the other auxiliary wing and, as a result, the flap underneath with which it is connected is pulled up by an amount proportional to the difference in lift (double dot chain line in FIG. 5), whereby the lift of the associated rotor is reduced. On the other hand, the auxiliary wing which is producing the smaller lift is lowered owing to the difference in lift and, as a result, the associated flap is pushed down by an amount proportional to the difference in lift (single dot chain line in FIG. 5), whereby the lift of the associated rotor is increased. Since the lifts of the two rotors are therefore constantly regulated, the helicopter is able to continue stable flight.

As described above, the angle of grade separation between the seesaw rod 10 and the axis of the rotors 3 and 4 is set so as to be in the vicinity between 0° and 180° as the phase difference.

Since the rotor, the flap, the seesaw rod and the auxiliary wing are connected by the connecting rod, they are rotated together in the same cycle.

For example, during forward flight, the lift of a rotating blade (rotor or auxiliary wing) can be expressed as the sine of a function of time or space or both including causing the action of gyro-precession.

The function of mutual effect between the rotor, the flap and the auxiliary wing of the seesaw rod is controlled by the action of gyro-precession and the angle of grade separation or the phase difference between the rotor and the leading seesaw rod in phase.

For example, the mutual effect or the flap effect is zero at the grade separation being 0° or 180°, and gradually increases from 0° to 90°. The mutual effect is maximum at 90° and gradually decreases from 90° to 180°.

The mutual effect can be expressed as a sine of the angle of grade separation or the phase difference between the rotor and the auxiliary wing of the seesaw rod.

Therefore, in this case the mutual effect is as follows K·sine $\delta$ where K is constant, and $\delta$ is the angle of grade separation or the phase difference between the rotor and the auxiliary wing. The maximum output K·1 is available at $\delta = 90°$.

The flapping by the action of gyro-precession of the leading auxiliary wing 11 in phase, generates earlier than that of the rotor 3 at the standard position A. The magnitude of the flapping is in proportion to sine described in the foregoing, and the inclination of the swash plate 17. This flapping affects the flap 6 as the flap effect to regulate the lift of rotor 3 (FIG. 8).

Figure 8:
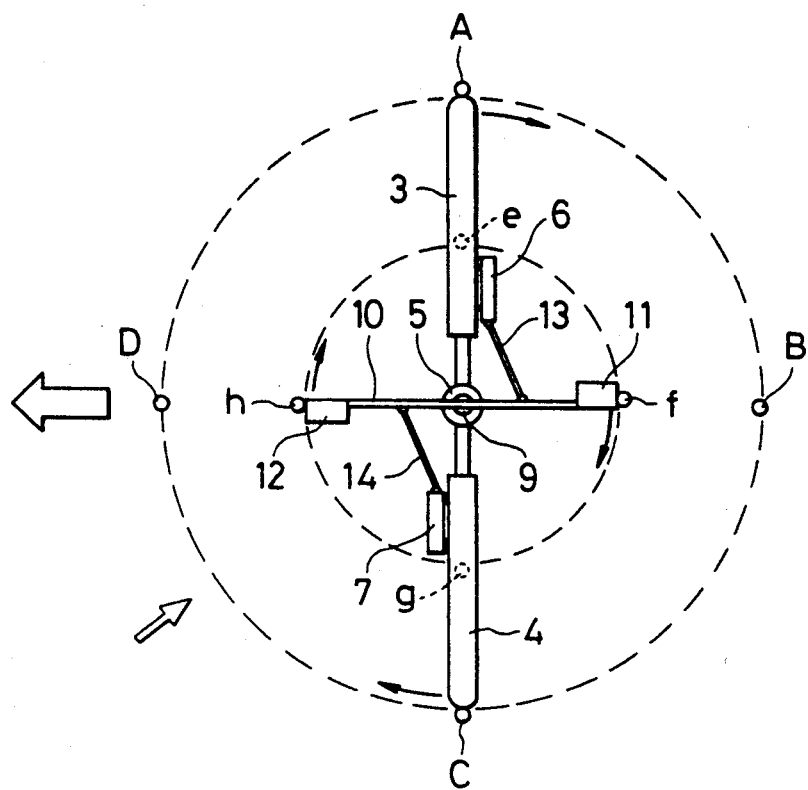
FIG. 8 is a plan view showing the principal parts of another embodiment of the helicopter according to the invention.

The helicopter of the present invention, in which the angle of grade separation between the seesaw rod 10 and the axis of the rotors 3 and 4 is 90° as shown in FIG. 8, will now be described aerodynamically.

In FIG. 8, the largest arrow indicates the direction in which the helicopter advances, points A, B, C and D fall equidistantly on the locus of rotation of the leading ends of the rotors 3 and 4, and points e, f, q and h fall equidistantly on the locus of rotation of the leading ends of the auxiliary wings 11 and 12.

By inclining the control stick forward, the vertical flight is changed to the horizontal flight. In this state, when the rotor 3 is positioned at point A being as a standard position, the rotor 3 exhibits a large inclination and a large lift, whereas the rotor 4 when positioned at point C exhibits a small inclination and a small lift. When the rotors 3 and 4 are positioned at points B and D, respectively, their lifts are of a medium value.

Due to the lift difference between the two rotors 3 and 4, therefore, rotor 3 is directed upward at point A and rotor 4 is directed downward at point C. Actually, however, the rotor 3 is directed upward at point B and the rotor 4 is directed downward at point D by the action of gyro-precession. Rotors 3 and 4 interchange their own movements every one-half rotation and continue to rotate. As a result, the surface of rotation of the rotors is inclined downward, thereby causing the helicopter to start advancing.

As the advancing speed of the helicopter increases, the lift of the rotor positioned at point C becomes large, whereas that of the rotor positioned at point A becomes small. This causes the rotor at point C to be directed upward (actually at point D by the action of gyro-precession) and the rotor at point A to be directed downward (actually at point B by the action of gyro-precession). As a result, the surface of rotation of the rotors inclined downward becomes horizontal to prevent the helicopter from advancing.

At this time, the control stick is required to be inclined further forward. As a result, a surge is likely to occur.

Since the rotors 3 and 4, flaps 6 and 7, seesaw rod 10 and auxiliary small wings 11 and 12 are connected by connecting rods 13 and 14 so as to constitute a link mechanism, they are rotated together. However, the seesaw rod 10 can also move up and down relative to the plane on which the rotors rotate, with the seesaw head 9 acting as a center.

The rotors 3 and 4 interchange their own movements every one-half rotation and to rotate, and also the auxiliary wings 11 and 12 interchange their own movements every one-half rotation and continue to rotate.

When the control stick is inclined forward, the lift of the rotor at point A becomes large and that of the rotor at point C becomes small as described above. At this time, the lift of the auxiliary wing at point e being as a standard position becomes large and that of the auxiliary wing at point q becomes small. The lifts of the auxiliary wings at points f and h become of a medium value.

The auxiliary wing exhibiting a large lift at point e is raised actually at point f by the action of gyro-precession and, for this reason, the flap of the rotor which was at point A and has not yet reached point B is raised by the ascending force of the auxiliary wing transmitted via the seesaw rod and connecting rod. As a result, the lift of the rotor is reduced by the amount of the flap raised to moderate a surge (i.e. a sudden lift increase in this case). The auxiliary wing exhibiting a small lift at point q is lowered actually at point h by the action of gyro-precession. The descending force acts via the seesaw rod and connecting rod on the rotor which was at point C and has not yet reached point D to lower the flap of the rotor. As a result, the lift of the rotor is increased by the amount of the flap lowered to moderate a surge (i.e. a sudden lift decrease in this case).

These effects can be obtained not only during the forward flight but also during backward, leftward and rightward flights.

The helicopter of the present invention will now be described in terms of its stability. When a blast of wind (a type of surge) blows up in the direction indicated by a small arrow in FIG. 8 during horizontal flight, for example, the lift of the rotor 4 positioned at point C is increased to raise the rotor 4 at point D by the action of gyro-precession and the lift of the rotor 3 positioned at point A is decreased to lower the rotor 3 at point B by the action of gyro-precession. For this reason, the surface of rotation of the rotors of the helicopter is inclined in the direction opposite to the advancing direction to prevent the helicopter from advancing.

The blast of wind also affects the auxiliary wings 11 and 12 so that the lift of the auxiliary wing 12 positioned at point q is increased to raise the auxiliary wing 12 at point h by the action of gyro-precession and that the lift of the auxiliary wing 11 positioned at point e is decreased to lower the auxiliary wing 11 at point f by the action of gyro-precession. As a result, the flap 7 of the rotor 4 is affected by the rising force of the auxiliary wing 12 via the seesaw rod and connecting rod and is raised to decrease the lift of the rotor 4 and the flap 6 of the rotor 3 is affected by the lowering force of the auxiliary wing 11 via the seesaw rod and connecting rod and is lowered to increase the lift of the rotor 3. Therefore, the lifts of the rotors 3 and 4 are liable to restore to the values assumed before receiving the blast of wind and the helicopter can continue to advance.

Although the flap exhibits a small lift, when a surge is produced the flap functions as a surge arrester for automatically suppressing a suddenly produced large lift of the rotor.

Figure 9:
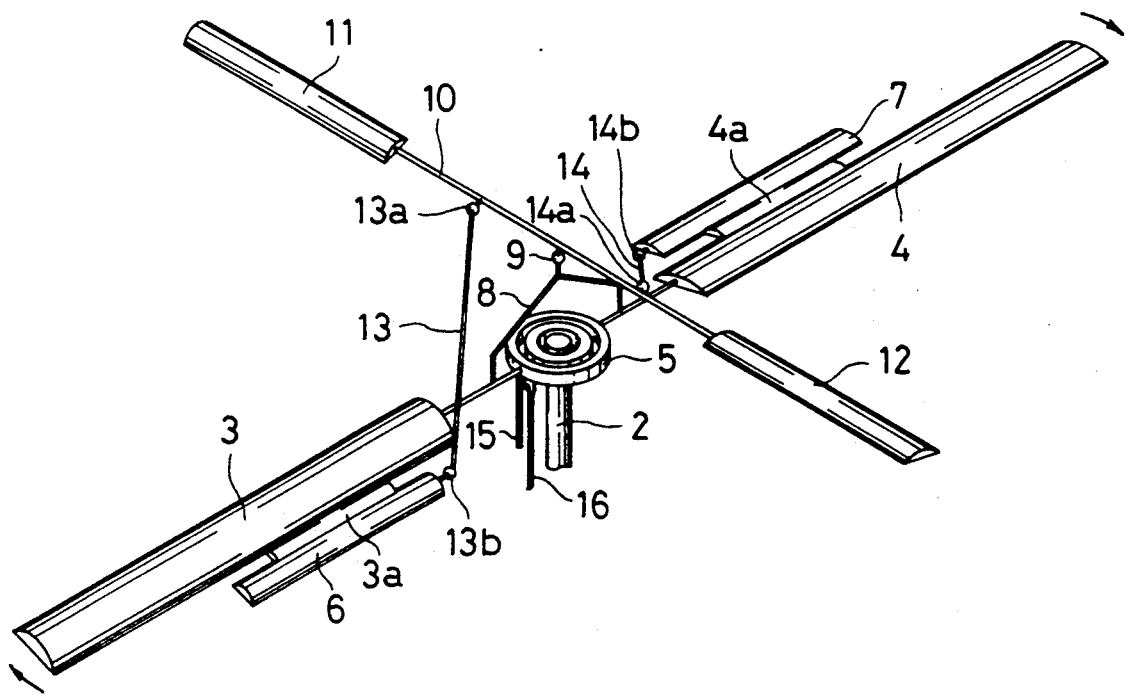
FIG. 9 is a perspective view of still another embodiment of the helicopter according to the invention.

While the embodiment described in the foregoing relates to a helicopter having the flaps 6, 7 hinged to the leading edges of the rotors 3, 4, the same effect can be obtained by, as shown in FIG. 9, attaching flaps 6, 7 to the trailing edges of the rotors 3, 4 by means of hinges 3a, 4a, by offsetting the positions of the rotors 3, 4 and the auxiliary wings 11, 12 by 90°.

As is clear from the foregoing explanation, in this invention, when a difference arises between the lifts of the two rotors during flight, the accompanying rise/fall of the auxiliary wings positioned above the rotors is immediately and automatically used to rotate the rotor flaps for decreasing/increasing the rotor lifts so as to constantly regulate them. The effect of the invention is thus reliably obtained without the use of any special drive devices, with little likelihood of gyroscopic precession when the rotor lifts have been regulated. Since regulating the lifts of the two rotors, extraordinary flapping and dragging can also be eliminated. As a result, the helicopter is able to perform stable flight and, moreover, to enjoy a longer service life owing to the fact that the rotors, fuselage and other components are exposed to little vibration.

Obviously, numerous modifications and variations of the present invention are possible in light of the above teachings. It is therefore to be understood that within the scope of the appended claims, the invention may be practiced otherwise than as specifically described herein.

What is claimed is:

1. A helicopter comprising
   a fuselage,
   a rotor head supported at a position above the fuselage by a rotor shaft connected with and driven by an engine,
   a pair of rotors fixed at their roots to the outer edge of the rotor head at a predetermined pitch angle and at positions spaced from each other by 180°,
   a pair of flaps one of which is rotatably hinged to one edge of each rotor,
   a generally wishbone-shaped supporting frame whose legs are attached to the rotor roots and extend upward to join at an apex,
   a seesaw rod supported by the supporting frame to be swingable about the apex thereof,
   a pair of auxiliary wings fixed at a prescribed pitch angle to opposite ends of the seesaw rod and positioned above the pair of rotors, and
   a pair of connectors each connected at one end with one of the flaps and at the other end with the seesaw rod positioned above the flap,
   any difference in lift between the pair of auxiliary wings causing the seesaw rod to incline to change the angle of attack of the flaps for increasing the flap effect of the rotor on the side of the auxiliary wing producing smaller lift and decreasing the flap effect of the rotor on the side of auxiliary wing producing larger lift.

2. A helicopter according to claim 1 wherein the apex of the supporting frame is provided with a spherical seesaw head for swingably supporting the seesaw rod.

3. A helicopter according to claim 1 wherein the axis of said pair of rotors and said seesaw rod form therebetween an angle of grade separation in the range of 0° to 180°.

4. A helicopter according to claim 1 wherein the flaps are hinged to the leading edges of the rotors.

5. A helicopter according to claim 1 wherein the flaps are hinged to the trailing edges of the rotors.

6. A helicopter according to claim 1 wherein the pitch angle of the rotors and the pitch angle of the auxiliary wings are the same.

* * * * *